United States Patent [19]
Smerdon, Jr.

[11] Patent Number: 6,092,897
[45] Date of Patent: Jul. 25, 2000

[54] ADJUSTABLE RETAINER FOR EYEGLASSES

[75] Inventor: E. Thomas Smerdon, Jr., Columbus, Ohio

[73] Assignee: First Echelon Sports, Inc., Columbus, Ohio

[21] Appl. No.: 09/370,421

[22] Filed: Aug. 9, 1999

[51] Int. Cl.[7] .................................................. G02C 3/00
[52] U.S. Cl. ............................................. 351/157; 351/156
[58] Field of Search ................................... 351/156, 157, 351/155, 41, 158; 2/452

[56] References Cited

U.S. PATENT DOCUMENTS

| | | | |
|---|---|---|---|
| 3,397,026 | 8/1968 | Spina | 381/157 |
| 3,728,012 | 4/1973 | Downey . | |
| 3,827,790 | 8/1974 | Wenzel . | |
| 3,874,776 | 4/1975 | Seron . | |
| 4,133,604 | 1/1979 | Fuller . | |
| 4,603,951 | 8/1986 | Beck et al. . | |
| 4,761,068 | 8/1988 | Star . | |
| 4,783,164 | 11/1988 | Heiberger . | |
| 4,790,646 | 12/1988 | Seron . | |
| 4,965,913 | 10/1990 | Sugarman . | |
| 4,976,531 | 12/1990 | Kahaney . | |
| 5,087,118 | 2/1992 | Gill . | |
| 5,092,668 | 3/1992 | Welch et al. . | |
| 5,157,425 | 10/1992 | Liv . | |
| 5,507,075 | 4/1996 | Tillstrom . | |
| 5,541,676 | 7/1996 | Pallat . | |
| 5,575,042 | 11/1996 | Kalbach . | |
| 5,655,263 | 8/1997 | Stoller . | |
| 5,655,264 | 8/1997 | Davancens et al. . | |
| 5,786,882 | 7/1998 | Satterthwaite . | |
| 5,805,262 | 9/1998 | Deveney . | |
| 5,917,576 | 6/1999 | Falco . | |
| 5,926,855 | 7/1999 | Brodbeck . | |

*Primary Examiner*—Hung Xuan Dang

[57] ABSTRACT

An adjustable retainer for eyeglasses that have a pair of temple bars. The retainer includes two cords of preferably the same length, one of which is attached to the right temple bar and the other of which is attached to the left temple bar. In one embodiment, the cords are attached by inserting a loop in the end of the cord partially through a hole in the end of the temple bar, and then passing the tail end of the cord through the loop and pulling the cord to tighten the loop around the temple bar. In another embodiment, two elastic cords, each having an enlargement at one end, are pulled through their respective temple bar holes so that the enlargement is held against the outer surface of the hole. In both embodiments, the tail ends of the cords are inserted through a cord holder, which is preferably a cord lock, and secured together to form a stop for the cord holder.

11 Claims, 3 Drawing Sheets

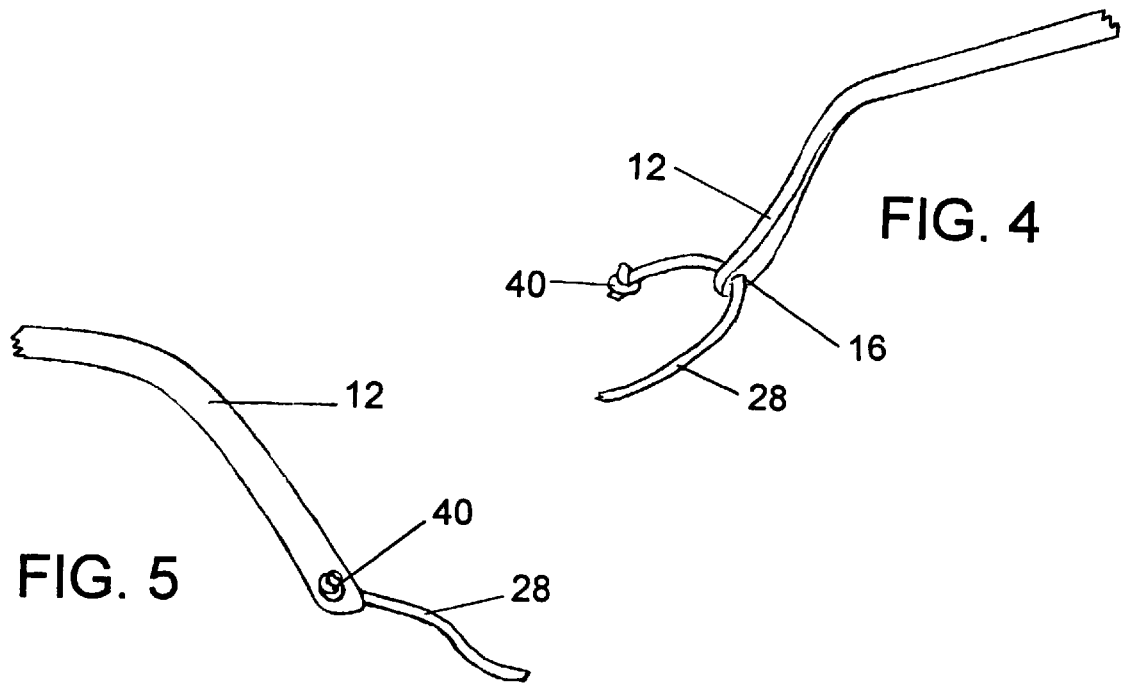
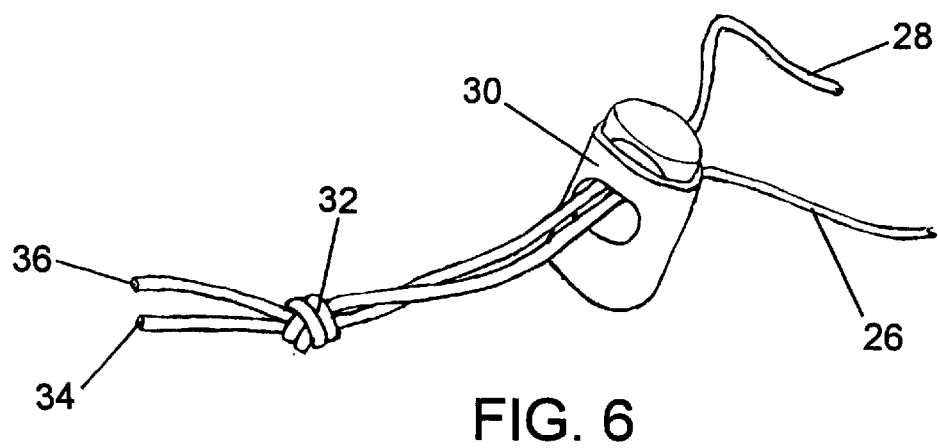

6,092,897

ADJUSTABLE RETAINER FOR EYEGLASSES

TECHNICAL FIELD OF INVENTION

The present invention relates generally to retainers for eyeglasses, and particularly to an adjustable elastic retaining cord system for eyeglasses having a pair of temple bars.

BACKGROUND OF THE INVENTION

A number of different retaining systems have been devised for preventing eyeglasses from slipping or falling off. Some of these systems rely on resilient straps to hold the eyeglasses securely on the wear's head during sports and other physical activities. Some strap systems may permit limited adjustability of the strap tension by means of a buckle, hook and loop fasteners, or by allowing the user to adjust the point of attachment to the eyeglass temple bars. Other eyeglass retention systems rely on single lengths of cord or tubular material that are attached to the temple bars. The materials used in the retaining cords and tubes, and the elasticity of those materials, vary considerably. Some of the retention systems that use cords and tubes, unlike the systems that use flat straps, use a long cord with a slider that frictionally engages the doubled cord behind the head. The slider allows the user to adjust the cord tension and to release it entirely in order to lower the eyeglasses to hang loosely below the neck and at a preferred distance below the neck.

A problem encountered by all of the prior art eyeglass retention systemsconcerns the means of attaching the retention straps, cord or tubing to the eyeglass temple bars. Some eyeglass retention systems rely on sleeves that slide over the end of the temple bar, as shown in U.S. Pat. No. 5,575,042 to Kalbach (1996). Sleeves that fit over the portion of the temple bar in front of the downwardly curving section of the temple bar are shown in U.S. Pat. No. 4,133,604 to Fuller (1979), U.S. Pat. No. 5,157,425 to Liu (1992), and U.S. Pat. No. 5,087,118 to Gill (1992). A number of systems rely on elastomeric rings and loops of various configurations that are attached to each end of a retainer cord and frictionally engage the temple bars. Examples of such systems are disclosed in U.S. Pat. No. 3,874,776 to Seron (1975), U.S. Pat. No. 4,790,646 to Seron (1988), U.S. Pat. No. 4,965,913 to Sugarman (1990), U.S. Pat. No. 5,092,668 to Welch, et al. (1992), U.S. Pat. No. 5,655,264 to Davancens, et al. (1997), and U.S. Pat. No. 5,805,262 to Deveney (1998). Other systems employ loops that are formed in the end of the retainer cord and are tightened around the temple bar by pulling the cord through a sleeve, as shown, for example, in U.S. Pat. No. 3,827,790 to Wenzel (1974), and U.S. Pat. No. 4,783,164 to Heiberger (1988). U.S. Pat. No. 5,507,075 to Tillstrom (1996) discloses a loop/spring combination whereby the loop is held onto the temple bar by the compression of the spring.

Another method of attaching a retention cord to the temple bars is disclosed by U.S. Pat. No. 5,786,882 to Satterthwaite (1998), which shows eyeglass temple bars with forward-facing slots in the ends of each temple bar that engage a continuous elastic band, such as a rubber band, or each end of a single length of elastic band material. U.S. Pat. No. 4,603,951 to Beck, et al. (1986) shows an eyeglass frame with a hole at the end of one temple bar and a longitudinal opening in the end of the other temple, so that an elastic band can be inserted through the holes, with an enlarged end of the cord engaging the hole in the first temple and the other end engaging the longitudinal opening in the second temple in a self-locking manner. U.S. Pat. No. 4,761,068 to Star (1988) shows two retaining straps having hook and loop fasteners on one end and mushroom-shaped tips on the other end that are inserted through holes in the temple bars and secured with small C-shaped clasps. A different approach is disclosed in U.S. Pat. No. 4,976,531 to Kahaney (1990), which shows a strap assembly that, in one embodiment, snaps into suitably-sized holes in the end of each temple bar.

U.S. Pat. No. 3,728,012 to Downey (1973) discloses an eyeglass retention system wherein the retaining strand is a plastic monofilament line that passes behind the head and through openings in the temple bars. The strand is tensioned by pulling one or both of its ends, and the high friction of the strand against the openings holds the eyeglasses in the desired position. U.S. Pat. No. 5,655,263 to Stoller (1997) discloses a retaining cord with ends that pass outwardly through holes in each temple, with each end then being inserted through a friction block and knotted. The eyeglasses can be held snugly against the face by pulling each end knot laterally and moving the friction blocks against their respective temple bar, with the result that the cord ends hang down on both sides of the neck behind the ear. To lower the eyeglasses, the friction blocks are moved toward the ends of the cord. This system also calls for the cord to have sufficient surface texture to hold the eyeglasses at the desired level below the neck by the friction of the cord against the inside surface of the holes.

Yet another approach to securing the retainer cord to the temple frames is shown in U.S. Pat. No. 5,917,576 to Falco (1999), which discloses a retaining band comprised of a single length of polymeric material that is bonded to the end of each temple bar. The polymeric retaining band can be permanently stretched by the user to customize its length within the elongation limits of the material. U.S. Pat. No. 5,541,676 to Pallat (1996) eliminates the temple bars altogether and shows the retainer cords being attached to the temple bar hinges on the each side of the front lens-containing portion of the eyeglass frame. U.S. Pat. No. 5,926,855 to Brodbeck (1999) shows a system for securing goggles of the type used by swimmers that involves threading a single length of elastic shock cord through a hole on each side of the goggle, and then inserting the ends of such single cord through a spring-loaded cord lock. This arrangement results in a double strap system around the back of the head and permits strap tension to be adjusted by moving the cord lock.

There are a number of disadvantages and limitations associated with the retaining systems disclosed by the prior art, particularly where extended-wear comfort, appearance, and manufacturing cost are all important considerations. The goggle-type bands and straps are well suited for applications where a snug fit over short periods is required, but they tend to be too tight and uncomfortable for extended or casual wear. These strap systems also do not allow the eyeglass to be lowered to hang on the chest, as do some of the adjustable cord retainer systems. However, the braided cords and tubular bands typically used in adjustable cord systems can feel heavy and bothersome on the neck and shoulders.

Furthermore, the means disclosed by the prior art for attaching the retaining systems to the temple bars also have significant drawbacks. The attachment rings and sleeves that fit over the temple bar can affect the way the temple bar feels as it passes over and behind the ear, and thus can be annoying to many eyeglass wearers. The elastomeric rings can be pulled off inadvertently if they have not been tightly secured or if the temple bar lacks a substantial flare at the end to help keep the ring on the bar. A number of popular sunglass styles have a sleek, minimalist appearance with narrow temple bars that have very little, if any, flare at the end. The prior art eyeglass retainers with enlarged ends that engage holes in the temple bars have the significant limitation of not working with holes that exceed a certain maximum size. Eyeglass retainer systems that adjust by pulling the ends of the retainer strands laterally from the temple result in unsightly and bothersome strand ends hanging down behind each ear. Furthermore, the complexity of some retention systems renders them impractical from a manufacturing cost standpoint.

SUMMARY OF THE INVENTION

It is an object of the present invention to provide an eyeglass retention system that is light, comfortable and attractive, and that eliminates annoying and uncomfortable rings, sleeves, and loops that attach around the temple bar of the eyeglass frame. It is also an object of the present invention to provide a means of attaching the cord to the temple bars that is both extremely secure and unobtrusive, and which does not affect the feel of the temple bar as it passes behind the ear.

Yet another object of the present invention is to provide a convenient method of adjusting the tension of the retention cords to suit individual preference. It is also an object of the present invention to provide a system that will prevent slippage of eyeglasses during vigorous physical activity. Another object is to allow the eyeglasses to be suspended comfortably below the neck, at a distance easily adjusted by the user, when the eyeglasses are not being worn.

It is also an object of the present invention to provide an eyeglass retention system that has a sleek, minimalist appearance that is in keeping with many popular styles of sunglasses and safety glasses.

It is also an object of the present invention to provide an eyeglass retention system that is economical to manufacture, and that works well with a number of popular styles of safety glasses, which have holes at the ends of the temple bars. A further object is to provide a system that can be easily made to work with virtually all eyeglass temple bars by simply drilling small holes in the ends of each temple bar.

BRIEF DESCRIPTION OF THE DRAWINGS

FIG. 4 is a perspective view of a left temple bar showing the retainer cord passing through a small hole in the end of the temple bar and an overhand knot tied in the end of the cord.

FIG. 5 is a side view of a left temple bar showing the knotted end of the retainer cord pulled against the hole in the end of the temple bar.

FIG. 6 is a perspective view of the ends of the retainer cords knotted to form a stop for a cord lock.

DETAILED DESCRIPTION OF THE INVENTION

Figure 1:
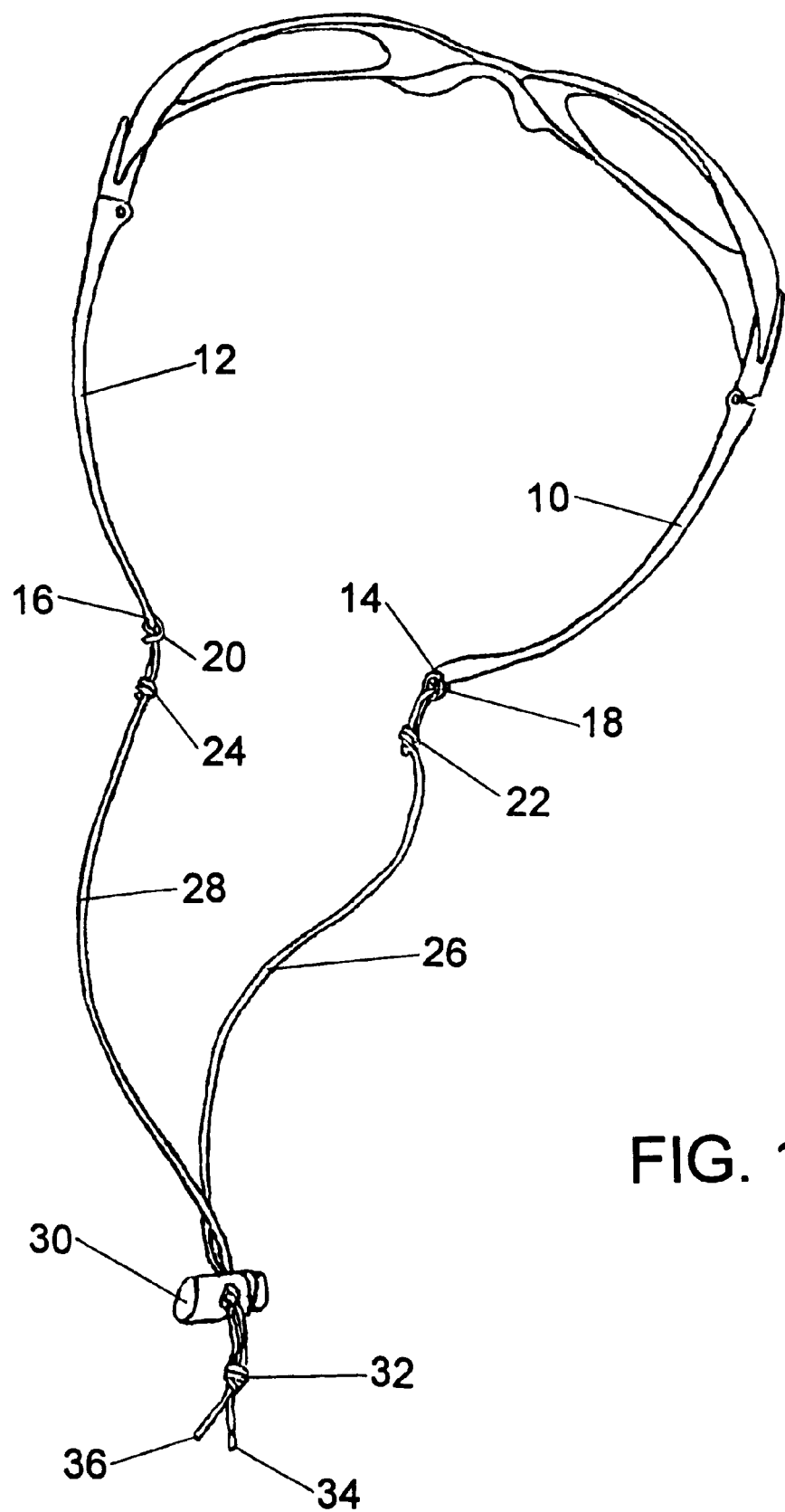
FIG. 1 is a perspective view of the retainer system of the present invention with the retainer cords attached to each temple bar of conventional safety eyeglasses.
Figure 2:
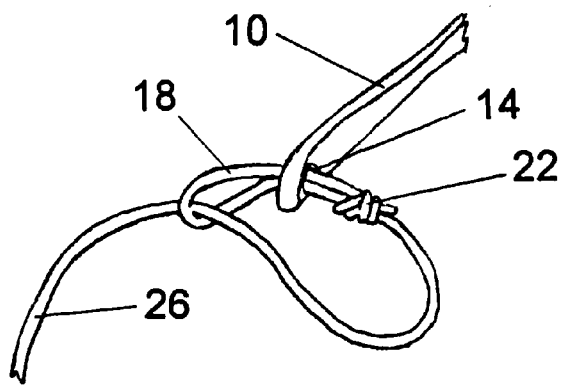
FIG. 2 illustrates the method for attaching the loop end of the retainer cord to a temple bar.
Figure 3:
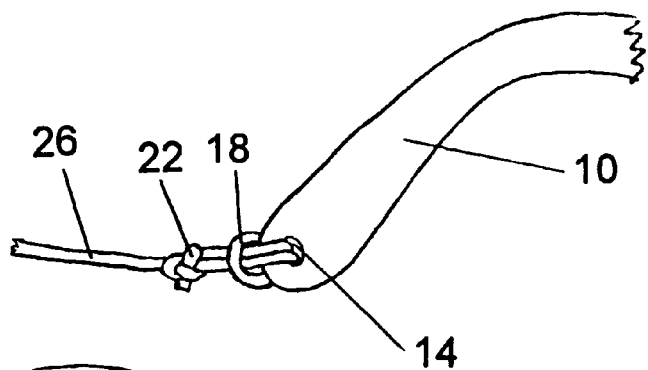
FIG. 3 shows a right and left side view of the looped end of a retainer cord secured through a hole in the end of a temple bar.
Figure 3:
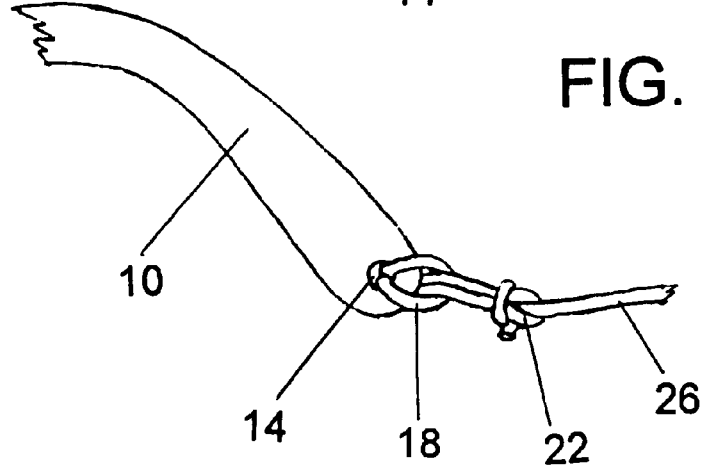

As illustrated in FIG. 1, the eyeglass retainer of the present invention comprises a first retainer cord 26 that attaches to the end of a right temple bar 10 and a second retainer cord 28 that attaches to the end of a left temple bar 12. In the embodiment illustrated in FIG. 1, the retainer cords are attached to the temple bars by inserting loops 18, 20 that have been tied in one end of each retainer cord partially through their respective holes 14, 16 in the ends of the temple bars. The tail ends 34, 36 and the knots 22, 24 used to tie the loops are passed through their respective loops and pulled tight. In the preferred embodiment, the tail ends 34, 36 of the two cords are then passed through the aligned holes in a springably released cord lock 30 and tied together so that the resulting knot 32 forms a stop for the cord lock. FIG. 2 shows the method for securing the looped end of the retainer cord to the hole in end of the temple bar. FIG. 3 shows the two side views of the finished attachment of the retainer cord to the temple bar after the loop has been pulled snugly against the temple bar. Although FIGS. 2 and 3 show the direction of the insertion of the loop 18 into the hole 14 in right temple bar 10 being from the outside of the temple bar toward the inside, the direction of insertion of the retainer cord loops is not critical. A variety of materials can be used for the retainer cords of this embodiment, but the preferred material is elastic cord with a rubber core and a stretchable fabric covering. In particular, round elastic cord with a diameter of approximately 1/16" has been shown to work very well.

The loops on each retainer cord may be formed by any of a number of conventional methods, but the preferred method is by means of a simple overhand knot or a so-called "perfection loop" knot, which is often used to tie loops in fishing line. The loops 18, 20 should be made large enough to allow their respective knots 22, 24 to pass through when the retainer cord is pulled tight. The tag end of the knots should be trimmed. If the preferred elastic cord material is used, sufficient heat should be applied to the trimmed tag end to melt the end of the fabric covering to prevent it from fraying.

FIG. 4 shows another means of attaching the retainer cords to the temple ends, which is well-suited for temple ends having a narrow profile that will not accommodate a hole large enough for a loop to pass through. In this embodiment, the retainer cords have one end that is enlarged, preferably by means of an overhand knot 40. Other methods of enlarging one end of each cord will also work, but an overhand knot has the advantage of being very simple and inexpensive to execute. As with the loop knot, the tag end of the overhand knot should be trimmed and heated to prevent fraying. The tail end of the cord is passed through a hole 16 in the temple end, and then pulled through the hole until the knot or other enlargement rests against the surface surrounding the hole. Preferably, the cord is fed through the hole from the outside of the temple bar, so that the knots do not contact the the neck when the eyeglasses are being worn. FIG. 5 is a side view from the outside of the left temple bar 12 showing the knot 40 pressed against the temple bar surface around the hole. For the embodiment illustrated by FIGS. 4 and 5, the retainer cord is a round, small diameter elastic cord. A combination of a 1/16" diameter elastic cord and a 3/32" hole diameter has been shown to work well in this application. Most narrow profile temple bars will accommodate a hole of this size, and 3/32" drill bits are commonly available, making it easy for temple bars that lack holes in the ends to be adapted for use with this embodiment of the present invention. A 1/16" elastic diameter cord securely retains the eyeglasses and yet is very light and comfortable. The narrow cord profile also fits well with the sleek design of many popular styles of sunglasses and safety eyeglasses.

FIG. 6 is an illustration of the tail ends 34, 36 of the retainer cords secured together by means of the preferred overhand knot 32, which also serves as a stop for a cord lock 30, the preferred cord holding means. One advantage with using an overhand knot as a cord stop is that it can be relatively easily untied in order to remove the retainer cords if desired. The knot or other cord securement means should be large enough to prevent the cord lock or other cord holding means from easily passing over the securement means. Two cord lock models that have been shown to work well in this application are the Ellipse manufactured by ITW Nexus and the Pop-Lock manufactured by National Molding Corporation. These cord locks are both quite small and lightweight and have a similar elliptical profile when viewed from the top or bottom. This shape gives the sides of the cord lock a somewhat flatter contour, which is comfortable when the cord lock is pulled against the back of the head. The even smaller and lighter Posi-Grip cord lock from National Molding Corporation has an all-plastic construction and also works satisfactorily. It can be appreciated that other means of adjusting and maintaining the tension of the retainer cords, such as decorative beads that frictionally engage the first and second cords, will also work. However, it can also be appreciated that the frictional engagement of beads and rings against the retainer cords is typically not as secure as that provided by a spring-loaded cord lock. Preferably, the length of each retainer cord from the hole in the temple bar to the knot at the tail end should be approximately the same, so that the cords hang evenly. The distance from the end of the temple bar to the knot tying the tail ends together can vary considerably, provided that such distance is sufficiently long to allow the eyeglasses to be easily removed and suspended comfortably below the neck when the cord holder is positioned against the knot.

The looped-end retainer cords will readily work with a number of popular safety eyeglasses that have temple bars with holes molded into the ends. For example, the looped-end embodiment works without any adaptation with several models of safety eyeglasses manufactured by UVEX Safety, a leading manufacturer of safety glasses, and with a number of popular models from other safety eyeglass manufacturers. Moreover, when the preferred 1/16" diameter elastic cord is used, virtually any eyeglasses with temple bars can easily be adapted to work with an embodiment of the present invention by drilling 1/8" holes (for looped-end retainer cords) or 3/32" holes (for knotted-end retainer cords) in the ends of each temple bar.

While the present invention has been described with respect to specific embodiments, it is to be understood that other modifications and changes may be made to the disclosed embodiments without departing from the spirit and scope of the invention as defined by the following claims.

I claim:

1. An adjustable retainer for eyeglasses having a pair of temple bars, comprising, in combination:
   (a) A first cord having a loop on one end, said cord being secured to a first eyeglass temple bar by passing said loop partially through a hole in the end of said first temple bar and then inserting the tail end of said cord through the portion of said loop that has passed through said hole and then pulling said cord so that said loop tightens against said temple bar;
   (b) A second cord having a loop on one end, said cord being secured to a second eyeglass temple bar by passing said loop partially through a hole in the end of said second temple bar and then inserting the tail end of said second cord through the portion of said loop that has passed through said hole and then pulling said cord so that said loop tightens against said temple bar;
   (c) A slidably adjustable holding means that frictionally engages said first and second cords and through which the tail ends of said first and second cords, after having passed through their respective looped ends, are inserted and secured together to form a stop for said holding means.

2. The adjustable retainer of claim 1 wherein the holding means is a springably released cord lock having an inner plunger and an outer housing and through holes that align when said plunger is depressed and are misaligned when said plunger is released.

3. The adjustable retainer of claim 1 wherein the lengths of the first and second cords from the end of the loop to the tail end are approximately the same.

4. The adjustable retainer of claim 1 wherein the tail ends of the first and second cords are secured together by means of a knot.

5. The adjustable retainer of claim 1 wherein the first and second cords are elongated cylindrical elastic cords with a diameter of between 0.05 and 0.10 inches.

6. The adjustable retainer of claim 1 wherein the loops in the first and second cords are tied in the end of said cords.

7. An adjustable retainer for eyeglasses having a pair of temple bars, comprising, in combination:
   (a) A first elongated cylindrical elastic cord having a diameter of between 0.05 and 0.10 inches and having an enlargement on one end, with said cord being secured to a first temple bar by passing the non-enlarged tail end through a hole in the end of said first temple bar so that said enlargement bears against, and is retained by, the temple bar surface surrounding said hole;
   (b) A second elongated cylindrical elastic cord having a diameter of between 0.05 and 0.10 inches and having an enlargement on one end, with said cord being secured to a second temple bar by passing the non-enlarged tail end through a hole in the end of said second temple bar so that said enlargement bears against, and is retained by, the temple bar surface surrounding said hole;
   (c) A slidably adjustable holding means that frictionally engages said first and second cords and through which the tail ends of said first and second cords, after having passed through the holes in the ends of their respective temple bars, are inserted and secured together to form a stop for said holding means.

8. The adjustable retainer of claim 7 wherein the enlargements at the ends of the first and second cords are formed by tying an overhand knot in one end of said cords.

9. The adjustable retainer of claim 7 wherein the holding means is a springably released cord lock having an inner plunger and an outer housing and through holes that align when said plunger is depressed and are misaligned when said plunger is released.

10. The adjustable retainer of claim 7 wherein the lengths of said first and second cords from the enlarged end to the tail end are approximately the same.

11. The adjustable retainer of claim 7 wherein the tail ends of the first and second cords are secured together by means of a knot.

* * * * *